July 29, 1941.  R. E. HORGER  2,250,801
LOCOMOTIVE ROD BEARING
Filed June 3, 1940  2 Sheets-Sheet 1
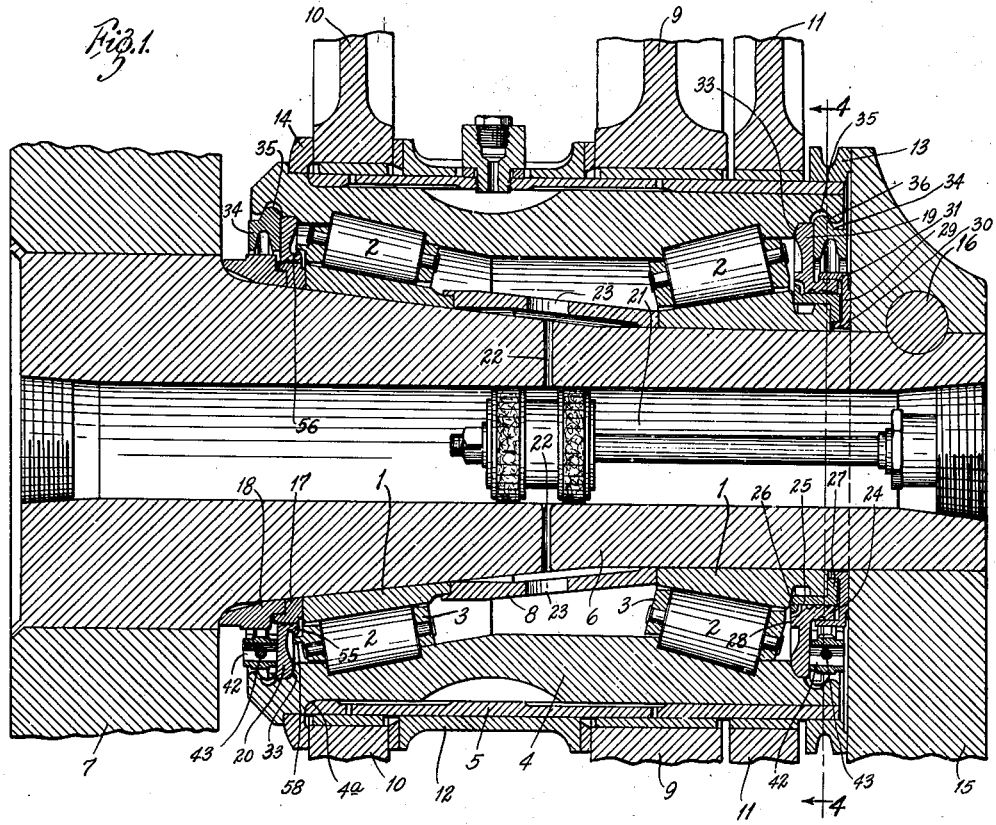
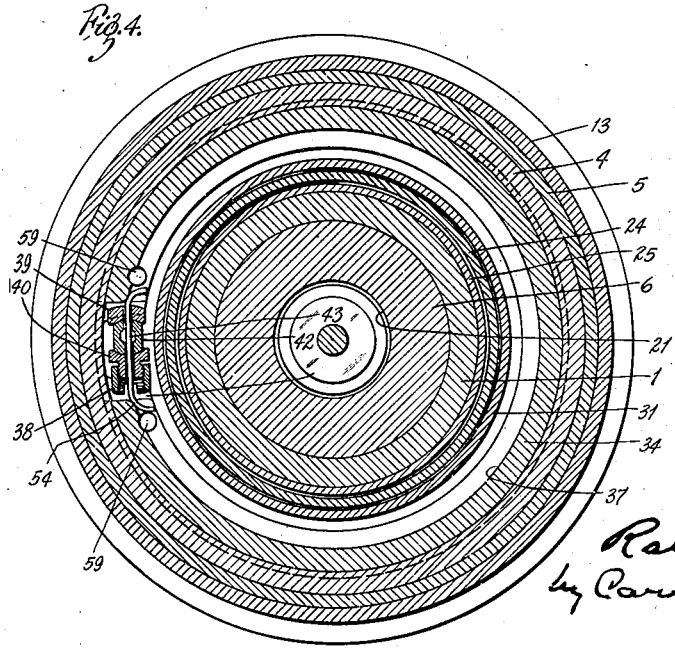
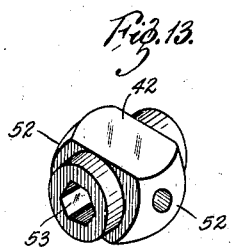
INVENTOR:
Ralph E. Horger
by Carruth Carruth Kneavely
HIS ATTORNEYS.

July 29, 1941.  R. E. HORGER  2,250,801
LOCOMOTIVE ROD BEARING
Filed June 3, 1940    2 Sheets-Sheet 2
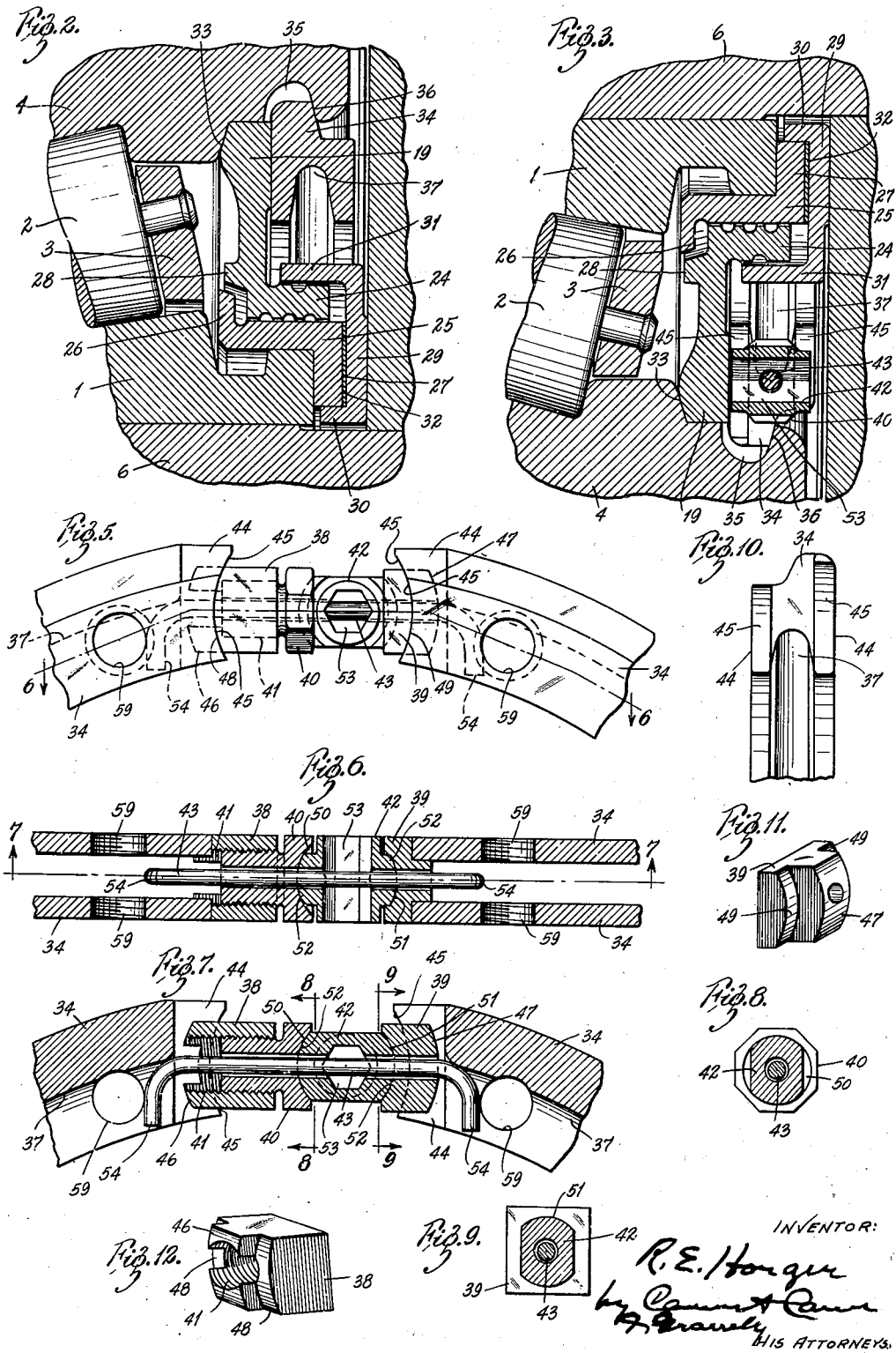
INVENTOR:
R. E. Horger
HIS ATTORNEYS Patented July 29, 1941

2,250,801

UNITED STATES PATENT OFFICE 2,250,801

LOCOMOTIVE ROD BEARING

Ralph E. Horger, Canton, Ohio, assignor to The Timken Roller Bearing Company, Canton, Ohio, a corporation of Ohio Application June 3, 1940, Serial No. 338,502

13 Claims. (Cl. 308—207)

This invention relates to bearings, particularly locomotive rod bearings, and has for its principal object to improve the spacing device for the ends of the split locking ring for the oil retaining end closure of the bearing shown in my copending application Serial No. 314,776. The invention consists in the improved lock ring spacing device and in the parts and combinations and arrangements of parts hereinafter described and claimed.

In the accompanying drawings, which form part of this specification and wherein like symbols refer to like parts wherever they occur, Fig. 1 is a central horizontal section through a locomotive rod bearing embodying my invention, Fig. 2 is an enlarged fragmentary horizontal section through said bearing in the region of the outermost end closure and the split locking ring therefor, Fig. 3 is a section similar to Fig. 2, the section being taken through the split portion of said locking ring, Fig. 4 is a cross section on the line 4—4 in Fig. 1, Fig. 5 is a fragmentary outer end view of said locking ring and the spacing device therefor, Fig. 6 is a section on the line 6—6 in Fig. 5, Fig. 7 is a section along the line 7—7 in Fig. 6, Figs. 8 and 9 are cross sections through the spacing device on the lines 8—8 and 9—9, respectively, in Fig. 7, Fig. 10 is a fragmentary view of one of the block-receiving ends of said locking ring, Fig. 11 is a perspective view of the right-hand block shown in Figs. 5, 6 and 7, Fig. 12 is a perspective view of the left-hand block shown in Figs. 5, 6 and 7; and Fig. 13 is a perspective view of the spherical key member shown in Figs. 5, 6 and 7.

In the accompanying drawings, my invention is shown embodied in a doubled taper roller bearing comprising two cones or inner raceway members 1 whose raceways taper toward each other, circular series or rows of tapered rollers 2 for the respective cones mounted in suitable retaining cages 3 and a housing in the form of a single cup or outer raceway member 4 have depressed tapered raceways therein for the two series of rollers. A replaceable steel sleeve 5 is press-fitted or shrunk on the cup 4, the outer end of said sleeve being disposed flush with the corresponding end of said cup while the inner end of said sleeve abuts against an external annular shoulder 4a formed on said cup near the inner end thereof.

The bearing cones 1 are shown mounted on the crank pin 6 of the main driving wheel 7 of a locomotive, with a suitable spacing sleeve 8 mounted on said pin between said cones, the outermost cone being pressfitted on the cylindrical outer end portion of said pin and the innermost cone being pressfitted on the tapered inner end portion thereof. The main rod 9, front side rod 10 and rear side rod 11 of the locomotive have their adjacent ends journalled on the steel sleeve 5 of the single cup or outer raceway member 4. A suitable spacing sleeve 12 is mounted on the cup sleeve 5 between the main rod 9 and the front side rod 10. An externally grooved outer abutment ring 13 is sleeved on the outer end of the cup sleeve 5 adjacent to the outer side face of the rear side rod 11, and an abutment ring 14 is sleeved on the cup 4 between the exterior annular shoulder 4a thereof and the inner side face of the front side rod 10. The double taper bearing, together with the rod ends, spacing sleeve and abutment rings, is held on the crank pin 6 by the eccentric crank 15 of the locomotive valve gear (not shown), said crank pin being rigidly secured to the outer end of said crank pin by means of a pin 16. Suitable spacing sleeves 17 and 18 are mounted on the tapered portion of the crank pin 6 between the wheel seat portion thereof and the inner end of the innermost cone or raceway member, the outermost spacing sleeve 17 being counterbored to snugly receive the reduced abutting end of the innermost sleeve 18.

The annular space between the cones 1 and the cup 4 of the double roller bearing is closed at the outer and inner ends thereof by means of end closure members 19 and 20, respectively. This annular space is supplied with lubricant from an axial reservoir 21 in the crank pin through radial passageways 22 therein that open into said space through radial holes 23 in the spacing sleeve 8 for the cones or inner raceway members 1 of the bearing.

The outermost end closure member 19 comprises an annular plate having an outwardly extending internally and externally grooved hub 24 that closely encircles a sleeve 25 that is pressfitted on the outer end of the outermost bearing cone and terminates at its inner end in an outwardly extending oil flinger flange 26 and at its outer end in an inwardly extending stop flange 27 that abuts against the outer end of said cone. The oil flinger flange 26 of the sleeve 25 is spaced inwardly of the end closure plate 19, and this plate has a projecting annular rib 28 on its inner face that overhangs and is slightly spaced from said flinger flange. An annular plate 29 is disposed between the outer end flange 27 of the sleeve 25 and the eccentric crank 15 and has an inwardly extending hub portion 30 that snugly fits within the opening defined by the inner periphery of said end flange. The annular plate 29 has an inwardly extending outer peripheral flange 31 that overlaps the outwardly extending circumferentially grooved hub portion 24 of the annular closure plate 19. Shims 32 are disposed between the annular plate 29 and the stop flange 27 of the sleeve 25 for obtaining proper adjustment of the bearings.

The outermost end closure 19 has a beveled annular inner face that seats against a beveled valve type seat 33 provided therefor in the bore of the cup or outer raceway member 4. Said end closure is held tightly against its beveled seat 33 by means of a split or open expansible locking ring 34 that seats within an annular groove 35 provided therefor in the bore of the outer raceway member or cup 4 outwardly of said seat. The outer wall of the internal annular groove 35 of the cup 4 and the face of the split locking ring cooperating therewith are inclined, as at 36, in the direction of the end closure 19 so that expansion of said ring will move the same inwardly against the outer end face of said end closure and thus press the latter tightly against its beveled seat 33 in said cup. As shown in the drawings, the locking ring 34 is grooved, as at 37, around its inner periphery to reduce the weight and increase the flexibility thereof.

A spacing device is interposed between the ends of the split locking ring 34 for holding the same expanded into tight engagement with the inclined outer wall of the internal groove 35 in the outer raceway member 4. This spacing device comprises a block 38 adapted to engage one end of the split locking ring 34, a block 39 adapted to engage the other end of said ring, an adjusting screw 40 threaded into a central longitudinal bore 41 in the block 38, a spherical key 42 interposed between and cooperating with the opposing ends of the block 39 and said adjusting screw, and a locking wire 43 for holding said blocks, adjusting screw and spherical key in endwise alinement. The bottom of the internal groove 37 of the split locking ring 34 terminates short of the spaced ends thereof, forming pairs of parallel lugs or wings 44 that terminate in concave seats 45. The blocks 38 and 39 have outstanding ribs or tongues 46 and 47 formed on their remote ends extending respectively between the pairs of wings 44; and said ends of said blocks are also provided on opposite sides of the tongues thereon with convexly curved shoulders 48 and 49 that seat in the concave seats 45 in the ends of the respective pairs of wings. The key opposing end of the adjusting screw 40 has a spherical recess 50 formed therein; and the key opposing end of the block 39 is also provided with a spherical recess 51, such recess, however, having straight parallel side walls (see Fig. 6). The key 42 has spherical end faces 52, one seating in the spherical recesses 50 of the adjusting screw and the other within the spherical recess 51 of the block 39. The key has a flat sided opening 53 extending centrally therethrough from side to side thereof crosswise of the axis of the adjusting screw. The locking wire 43 extends through registering central longitudinal bores provided therefor in the block 39, key 42 and adjusting screw 40 and the threaded screw receiving bore of the block 38 and has bent end portions 54 disposed in the opposing ends of the internal groove 37 of the locking ring 34.

The innermost end closure member 20 comprises an annular plate having an inwardly extending hub 55 that closely encircles the spacing ring 17 at the inner end of the innermost bearing cone and has an external oil collecting groove 56 disposed in underlapping relation to an outstanding flange 58 on the adjacent end of the cage 3 for the innermost series of bearing rollers 2. The inner end closure 20 has a beveled annular inner face; and this face, like the corresponding face of the end closure 19, seats against a beveled valve type seat 33 provided therefor at the inner end of the bore of the outer raceway member 4. This inner end closure 20, like the end closure 19, is held tightly against its beveled seat 33 by means of a split locking ring 34 that seats within an annular groove 35 in the bore of the outer raceway member 4. The innermost locking ring is held in its groove 35 by means of a spacing device exactly like the hereinbefore described spacing device for the outermost locking ring.

Each of the locking rings 34 is expanded, preferably by means of a separate spreading device (not shown) against the beveled wall of the groove 35 provided therefor in the bore of the outer raceway member, thereby forcing said locking ring inwardly against the adjacent end closure member and thus causing the latter to seat tightly against the valve type seat 33 provided therefor in said member. As shown in Figs. 5, 6 and 7, each locking ring is provided on opposite sides of the split therein with threaded holes 59 adapted to be engaged by threaded pins (not shown) of the spreading device hereinbefore referred to so as to facilitate the operating of expanding said ring into the groove 35 and in contracting said ring to remove the same from said groove. After the locking ring has been expanded into the groove and is still held in such position by the spreading device, the blocks 38 and 39 are placed between the ends of the locking ring and the adjusting screw 40 is screwed by hand into the threaded block 38 and adjusted to a position that will permit the spherical key 42 to be pushed between the two blocks and then turned and rotated by means of a hexagonal bar wrench (not shown) inserted in the hexagonal opening 53 in said key. The key 42 is then rotated by means of the bar wrench to cause the convex ends 52 thereof to seat tightly in the concave recesses in the ends of the block 39 and adjusting screw 40. The locking wire 43 is then laced through the blocks 38 and 39, screw 40 and spherical key 42 and the ends turned over in the groove 37 of the locking ring to retain the wire in locking position. The spacing device is of simple and compact construction and may be quickly and easily assembled and adjusted and locked in the desired position of adjustment. The key 42 is self-centering in the concave seats in the block 39 and screw 40, the convex ends of the blocks are likewise self-centering in the concave seats in the ends of the locking ring and said blocks are held against rotation by the lugs or tongues 46 and 47 that fit between the spaced branches at said ends of said ring.

Obviously, the hereinbefore described arrangement admits of considerable modification without departing from the invention and I do not wish to be limited to the precise construction shown and described.

What I claim is:

1. The combination of a housing having an opening therein, a member mounted in said opening, a split expansible locking ring seated in said opening in endwise abutting relation to said member, and a spacing device for the ends of said split locking ring, said spacing device comprising two blocks disposed with their remote ends in abutting relation to the respective ends of said split locking ring, an adjusting member mounted in one of said blocks for adjustment relative thereto to vary the effective length thereof, and a spacing member interposed between and in abutting relation to the opposing ends of said adjusting member and said other block for holding said blocks against the respective ends of said split locking ring.

2. The combination of a housing having an opening therein, a closure member seated in said opening, a split expansible locking ring seated in said opening alongside of said closure member, and a spacing device for the ends of said split locking ring, said spacing device comprising two blocks interposed between with their remote ends in abutting relation to the respective ends of said split locking ring, a screw threaded into one of said blocks for adjustment relative thereto to vary the effective length thereof, and a spacing member interposed between and in abutting relation to the opposing ends of said screw and said last mentioned block.

3. The combination of a housing having an opening therein, and an internal annular groove in said opening, a closure member seated in said opening inwardly of said annular groove, a split expansible locking ring seated in said groove alongside of said closure member, and a spacing device for the ends of said split locking ring, said spacing device comprising two blocks interposed between with their remote ends in abutting relation to the respective ends of said split locking ring, a screw threaded into one of said blocks for adjustment relative thereto to vary the effective length thereof, a spacing member interposed between and in abutting relation to the opposing ends of said screw and said last mentioned block, and a locking wire extending through alined openings provided therefor in said blocks, screw and spacing member.

4. The combination of a housing having an opening therein, a member mounted in said opening, a split expansible locking ring seated in said opening in endwise abutting relation to said member, and a spacing device for the ends of said split locking ring, said spacing device comprising two blocks disposed with their remote ends in abutting relation to the respective ends of said split locking ring, an adjusting member mounted in one of said blocks for adjustment relative thereto to vary the effective length thereof and a spacing member interposed between and in abutting relation to the opposing ends of said adjusting member and said other block for holding said blocks against the respective end of said split locking ring, the opposing ends of said adjusting member and said other block having recesses therein and said spacing member having end portions shaped to seat in the respective recesses.

5. The combination of a housing having an opening therein, a closure member seated in said opening, a split expansible locking ring seated in said opening alongside of said closure member, and a spacing device for the ends of said split locking ring, said spacing device comprising two blocks interposed between with their remote ends in abutting relation to the respective ends of said split locking ring, a screw threaded into one of said blocks for adjustment relative thereto to vary the effective length thereof, and a spacing member interposed between and in abutting relation to the opposing ends of said screw and said last mentioned block, the opposing ends of said screw and said other block having concave recesses therein and said spacing member having convex end portions adapted to seat in the respective recesses.

6. The combination of a housing having an opening therein, a closure member seated in said opening, a split expansible locking ring seated in said opening alongside of said closure member, and a spacing device for the ends of said split locking ring, said spacing device comprising two blocks interposed between with their remote ends in abutting relation to the respective ends of said split locking ring, a screw threaded into one of said blocks for adjustment relative thereto to vary the effective length thereof, and a spacing member interposed between and in abutting relation to the opposing ends of said screw and said last mentioned block, the opposing ends of said screw and said other block having concave recesses therein and said spacing member having convex end portions adapted to seat in the respective recesses, the remote ends of said blocks being convexly curved and said ends of said locking ring having concave seats therein for the convex ends of the respective blocks.

7. The combination of a housing having an opening therein, and an internal annular groove in said opening, a closure member mounted in said opening inwardly of said annular groove, a split expansion ring cooperating with said groove and said closure member for retaining the latter in said opening, and a spacing device for the ends of said expansion ring, said spacing device comprising two blocks disposed with their remote ends in abutting relation to the respective ends of said split ring, a screw threaded into one of said blocks and having a head facing the inner end of the other block, a key member interposed between and in abutting relation to said screw head and said other block, the opposing faces of said screw head and said other block having concave recesses therein and said key member having convex end portions adapted to seat in the respective recesses, the outer ends of said blocks being convexly curved and said ends of said locking ring having concave seats therein for the convex outer ends of the respective blocks, said key member having a flat-sided bar-wrench receiving opening extending therethrough intermediate between the convex ends thereof.

8. The combination of a housing having an opening therein, and an internal annular groove in said opening, a closure member mounted in said opening inwardly of said annular groove, a split expansion ring cooperating with said groove and closure member for retaining the latter in said opening, and a spacing device for the ends of said expansion ring, said spacing device comprising two blocks disposed with their remote ends in abutting relation to the respective ends of said split ring, a screw threaded into one of said blocks and having a head facing the inner end of the other block, a key member interposed between and in abutting relation to said screw head and said other block, and a locking wire extending through alined openings provided therefor in said blocks, screw and key number, the opposing faces of said screw head and said other block having concave recesses therein and said key member having convex end portions adapted to seat in the respective recesses, the outer ends of said blocks being convexly curved and said ends of said locking ring having concave seats therein for the convex outer ends of the respective blocks, said key member having a flat-sided bar-wrench receiving opening extending therethrough intermediate between the convex ends thereof, the concave ends of said ring having notches therein and the convex outer ends of said blocks having tongues thereon that extend into the respective notches.

9. The combination of a housing having an opening at its end and an internal annular groove in said opening, a closure member mounted in said opening inwardly of said annular groove, an internally grooved split expansion ring cooperating with said groove and said closure member for retaining the latter in said opening, and a spacing device for the ends of said expansion ring, said spacing device comprising two blocks disposed with their remote ends in abutting relation to the respective ends of said split ring, a screw threaded into one of said blocks with one end facing the inner end of the other block, a key member interposed between the opposing ends of said screw and said other block, and a locking wire extending through alined openings provided therefor in said blocks, screw and key member, the opposing ends of said screw and said last mentioned block having spherical recesses therein and said key member having spherical end portions adapted to seat in the respective recesses, the remote ends of said blocks being convexly curved and said ends of said locking ring having concave seats therein for the convex outer ends of the respective blocks, said key member having a flat-sided opening extending therethrough intermediate between the convex ends thereof adapted to receive a similarly shaped bar wrench, the concave ends of said ring being notched from the inner to the outer periphery thereof and the convex remote ends of said blocks having tongues thereon that snugly fit the respective notches, said locking wire terminating in laterally bent end portions that are disposed in the internal annular groove in said split locking ring.

10. A bearing comprising inner and outer raceway members, an annular end closure mounted in said outer raceway member, a split expansion ring in said outer raceway member for retaining said end closure therein, and a spacing device for the ends of said expansion ring, said spacing device comprising two blocks disposed with their remote ends in abutting relation to the respective ends of said split ring, an adjusting member mounted in one of said blocks with one end facing the opposing end of the other block, and a spacing member removably interposed between the opposing ends of said adjusting member and said last mentioned block for holding said blocks against the respective ends of said ring.

11. A bearing comprising an inner raceway member and an outer raceway member having an internal annular groove therein, an annular end closure member mounted in said outer raceway member inwardly of said annular groove, a split expansion ring cooperating with said groove and said end closure for retaining the latter in said outer raceway member, and a spacing device for the ends of said expansion ring, said spacing device comprising two blocks disposed with their remote outer ends in abutting relation to the respective ends of said split ring, a screw threaded into one of said blocks with one end facing the other block, a key member interposed between the opposing ends of said screw and said other block, the opposing ends of said screw and said last mentioned block having concave recesses therein and said key member having convex end portions adapted to seat in the respective recesses.

12. A bearing comprising an inner raceway member and an outer raceway member having an internal annular groove therein, an annular end closure member mounted in said outer raceway member inwardly of said annular groove, a split expansion ring cooperating with said groove and said end closure for retaining the latter in said outer raceway member, and a spacing device for the ends of said expansion ring, said spacing device comprising two blocks disposed with their remote outer ends in abutting relation to the respective ends of said split ring, a screw threaded into one of said blocks with one end facing the other block, a key member interposed between the opposing ends of said screw and said other block, and a locking wire extending through alined openings provided therefor in said blocks, screw and key member, the opposing ends of said screw and said last mentioned block having concave recesses therein and said key member having convex end portions adapted to seat in the respective recesses, the remote ends of said blocks being convexly curved and said ends of said locking ring having concave seats therein for the convex outer ends of the respective blocks.

13. A bearing comprising an inner raceway member and an outer raceway member having an internal annular groove therein, an annular end closure member mounted in said outer raceway member inwardly of said annular groove, a split internally grooved expansion ring cooperating with said groove and said end closure for retaining the latter in said outer raceway member, and a spacing device for the ends of said expansion ring, said spacing device comprising two blocks disposed with their remote outer ends in abutting relation to the respective ends of said split ring, a screw threaded into one of said blocks with one end facing the other block, a key member interposed between the opposing ends of said screw and said other block and a locking wire extending through alined openings provided therefor in said blocks, screw and key member, the opposing ends of said screw and said last mentioned block having concave recesses therein and said key member having convex end portions adapted to seat in the respective recesses, the remote ends of said blocks being convexly curved and said ends of said split ring having concave seats therein for the convex outer ends of the respective blocks, said key member having a flat-sided opening extending therethrough intermediate between the convex ends thereof adapted to receive a similarly shaped bar wrench, the concave ends of said ring having notches therein extending from the inner to the outer periphery thereof and the convex ends of said blocks having tongues thereon that extend into the respective notches, the ends of said locking wire extending into the annular groove in said split ring.

RALPH E. HORGER.